United States Patent [19]
Versteegh et al.

[11] Patent Number: 4,634,615
[45] Date of Patent: Jan. 6, 1987

[54] HEAT RECOVERABLE COEXTRUDED ARTICLES

[76] Inventors: Willem M. Versteegh, 457 Maar Ave., Fremont, Calif. 94538; Lester T. Toy, 33235 Pheasant St., Fremont, Calif. 94536; Christine Holland, 2904 Monterey St., San Mateo, Calif. 94403

[21] Appl. No.: 720,121

[22] Filed: Apr. 4, 1985

Related U.S. Application Data

[63] Continuation-in-part of Ser. No. 597,771, Apr. 6, 1984, abandoned.

[51] Int. Cl.[4] .............................................. F16L 9/14
[52] U.S. Cl. ...................................... 428/36; 428/913; 174/DIG. 8; 156/86; 138/141
[58] Field of Search ............. 174/DIG. 8; 156/84–86, 156/49–53, 344; 428/36, 516, 913; 138/141

[56] References Cited
U.S. PATENT DOCUMENTS

| | | | |
|---|---|---|---|
| 3,950,604 | 4/1976 | Penneck | 174/DIG. 8 |
| 4,035,534 | 7/1977 | Nyberg | 174/73 R |
| 4,168,192 | 9/1979 | Nyberg | 174/DIG. 8 |
| 4,383,131 | 5/1983 | Clabburn | 174/73 R |
| 4,390,745 | 6/1983 | Böttcher et al. | 174/DIG. 8 |

Primary Examiner—Roland E. Martin
Assistant Examiner—James J. Seidleck
Attorney, Agent, or Firm—Edith A. Rice; Herbert G. Burkard

[57] ABSTRACT

A heat recoverable tubular composite article comprising an inner layer comprising a crosslinked elastomeric polymeric material having a modulus at 100% elongation at 20° C. of about 40 to about 900 pounds per square inch and an outer layer comprising a thermoplastic material having a 2% secant modulus at 20° C. of about 5,000 to about 100,000 pounds per square inch said composite article (1) being formed by coextrusion, (2) having a direct bond between said layers with a peel strength of at least 6 pounds per linear inch, and (3) being in a radically expanded configuration, said thermoplastic outer layer being capable of retaining the elastomeric inner layer in an expanded configuration at ambient temperature and incapable of retaining the elastomeric layer in an expanded configuration at a temperature above a predetermined temperature thereby permitting the composite article to recover to or toward its unexpanded configuration.

11 Claims, 3 Drawing Figures

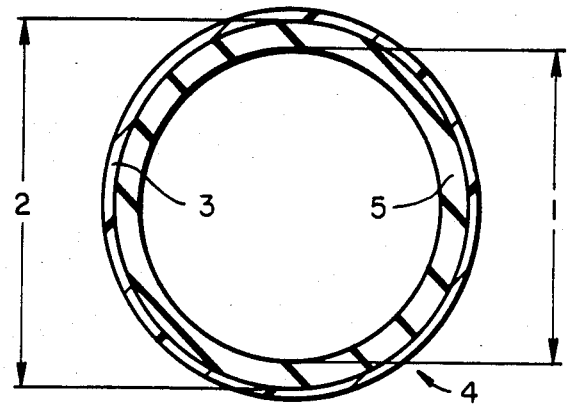
FIG_1
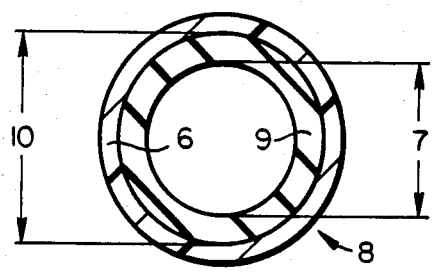
FIG_2
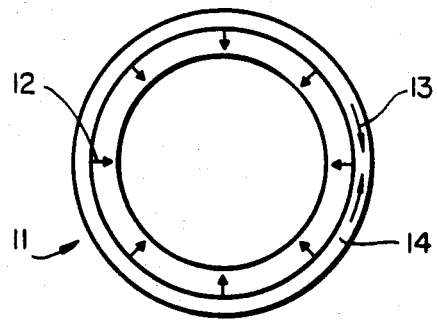
FIG_3

HEAT RECOVERABLE COEXTRUDED ARTICLES

This application is a continuation-in-part of U.S. application Ser. No. 597,771, filed Apr. 6, 1984, now abandoned, the disclosure of which is incorporated herein by reference.

BACKGROUND OF THE INVENTION (a) The Invention

This invention relates to a heat-recoverable composite tubular article. More particularly, the invention relates to a heat-recoverable composite tubular article formed of an inner layer of an elastomeric material and an outer layer of a thermoplastic material, and to a method of manufacturing the article by coextrusion.

(b) Background

Polymeric heat-recoverable articles are known and can be used for insulating and protecting electric components, such as cables and especially for enclosing joints between two electric power cables and cable terminations.

Such articles may comprise more than one layer of polymeric material. In U.S. Pat. No. 4,373,554 to Cook a heat-recoverable article having one lamina which is relatively fusible and a second lamina which is relatively infusible is prepared by compound extrusion. There is an intimate bond between the lamina. Each lamina is of a thermoplastic polymeric material. U.S. Pat. No. 3,669,824 to Hess describes a similar composite tubular article which is then helically slit to form a tape.

In U.S. Pat. No. 4,383,131 to Clabburn an enclosure or protective sleeve for a shielded cable termination or joint is described which enclosure comprises a conductive outer layer, an insulating inner layer and, optionally, an innermost stress grading layer. It is disclosed that one or more of the layers of the enclosure may be elastomeric. It is also disclosed that the enclosure may be made by coextrusion. However, the only specific examples of a coextruded product contain only thermoplastic layers.

In U.S. Pat. No. 4,390,745 to Bottcher et al. an enclosure for electrical apparatus is described comprising a first hollow sleeve of insulating material around which is positioned a second sleeve comprising an inner layer of insulating material and an outer layer of conductive material. The outer layer of the second sleeve may be thermoplastic and the inner layer, may be elastomeric. Preparation of such an article by coextrusion is not specifically taught.

In Great Britain Pat. No. 1,434,719, to Penneck, and U.S. Pat. No. 4,035,534 to Nyberg, herein incorporated by reference, there is disclosed an article comprising a laminate of an elastomeric layer which is deformed from its equilibrium configuration and a non-elastomeric thermoplastic layer which retains the elastomeric portion in the deformed configuration until heat is applied. The article is prepared by molding and bonding the layers together with heat and pressure. It is taught that the bond between the layers is improved with the use of adhesives. It has been found that in the manufacture of such articles by this method, an adhesive layer is usually required to maintain the bond between the layers during deformation (e.g. expansion) of the article. Further, where the product may be stored prior to use for a period of time, particularly at temperatures above about 50° C., the adhesive prevents separation of the layers of the article as the deformed elastomer layer attempts to prematurely recover.

In summary, Nyberg and Penneck disclose heat-recoverable composite articles comprising an elastomer layer and a thermoplastic layer. The method disclosed for manufacturing such articles comprises a molding technique and generally an adhesive is required to bond the layers together. Clabburn and Bottcher et al. disclose heat-recoverable articles for use in enclosing high voltage (i.e. above 1 kV) joints and terminations. The heat-recoverable articles used can be composite articles containing elastomeric and thermoplastic layers as in Nyberg and Penneck. Cook, Clabburn and Bottcher et al. discuss the preparation of composite heat-recoverable articles by compound extrusion or coextrusion, but refer to the use of thermoplastic materials in this context.

SUMMARY OF THE INVENTION

This invention provides a heat-recoverable composite tubular article comprising an outer thermoplastic layer and an inner elastomeric layer and a method of preparing such an article by coextrusion. The article has good storage properties at temperatures up to about 60°-70° C. and, when used to enclose a cable joint or termination causes minimal void formation between the article and the underlying substrate.

One aspect of this invention comprises a heat-recoverable tubular composite article comprising;

(a) an inner layer comprising a crosslinked elastomeric polymeric material having a modulus at 100% Elongation at 20° C. of about 40 to about 900 pounds per square inch; and (b) an outer layer comprising a thermoplastic material having a 2% secant modulus at 20° C. of about 5,000 to about 100,000 pounds per square inch;

said composite article (1) being formed by coextrusion, (2) having a direct bond between said layers with a peel strength of at least 6 pounds per linear inch, and (3) being in a radially expanded configuration, said thermoplastic outer layer being capable of retaining the elastomeric inner layer in an expanded configuration at ambient temperature and incapable of retaining the elastomeric layer in an expanded configuration at an elevated temperature thereby permitting the composite article to recover, when heated, to or toward its unexpanded configuration Another aspect of this invention comprises a method of producing a heat-recoverable composite tubular article which comprises:

(a) forming a composite tubular article by coextruding an outer layer of a thermoplastic material having a 2% secant modulus at 20° C. of about 5,000 to about 100,000 pounds per square inch and an inner layer of an elastomeric material;

(b) crosslinking the elastomeric material to an extent such that it has a modulus at 100% elongation at 20° C. of about 40 to about 900 pounds per square inch;

(c) heating the composite tubular article;

(d) radially expanding the composite tubular article at elevated temperature; and (e) cooling the article while it is retained in its expanded configuration; thereby producing a composite tubular article which has a direct bond between said layers with a peel strength of at least 6 pounds per linear inch, and which remains in a radially expanded configuration until application of heat renders the thermoplastic layer incapable of retaining the elastomeric layer in an expanded configuration.

Yet another aspect of the invention comprises a method of enclosing an elongate substrate which comprises:
(i) positioning over the substrate a heat-recoverable tubular composite article comprising
  (a) an inner layer comprising a crosslinked elastomeric polymeric material having a modulus at 100% elongation at 20° C. of about 40 to about 900 pounds per square inch; and
  (b) an outer layer comprising a thermoplastic material having a 2% secant modulus at 20° C. of about 5,000 to about 100,000 pounds per square inch;
said composite article (1) being formed by coextrusion, (2) having a direct bond between said layers with a peel strength of at least 6 pounds per linear inch, and (3) being in a radially expanded configuration;
(ii) applying heat to the article to cause the thermoplastic layer to weaken thereby permitting the elastomeric layer to recover toward its unexpanded configuration thereby causing the composite article to come into contact with the substrate.

DETAILED DESCRIPTION OF THE INVENTION

Several major problems have been discovered when attempting to make composite tubular heat-recoverable articles comprising an outer thermoplastic layer and an inner elastomer layer for use in high voltage applications. First, the article must be storage stable at temperatures up to at least 60° C. The articles must be such that on such storage conditions the article will not experience creep, premature recovery, delamination or splitting. Second, the article must be capable of, when positioned over, e.g. a high voltage cable joint and heated, recovering into contact with the cable in a relatively short period of time. Further, after the article has been installed over, e.g. a high voltage cable joint, it must be capable of maintaining a void-free interface with the cable even during repeated load cycling tests, for example I.E.E.E. Test 404, in which the cable is repeatedly heated, e.g. up to 130° C., maintained at elevated temperature for a period of time and then cooled. It has been found that a composite tubular article prepared in accordance with the teaching of Penneck and Nyberg suffer from one or more of the disadvantages outlined above, depending on the particular materials employed.

The article of this invention can be produced by coextrusion, a significant advantage over the molding process disclosed by Penneck and Nyberg, and is storage stable, i.e. does not tend to experience creep, premature recovery or delamination under typical storage conditions. Further, few, if any, voids form during load cycling at the interface between the article and an electric cable onto which it is recovered.

It has been found that to achieve these advantages, each of the elastomeric material and thermoplastic material should have certain physical properties. The crosslinked elastomeric material of the inner layer should have a modulus at 100% elongation at 20° C. of from about 40 to about 900 pounds per square inch (psi). A preferred modulus is from about 70 to about 200 psi.

The thermoplastic material of the outer layer should have a 2% secant modulus of at least about 5000 psi to about 100,000 psi at 20° C., preferably in about the range of about 15,000 to about 60,000 psi.

The wall thickness of the elastomeric and thermoplastic layers must also be considered. The wall thickness of the elastomeric layer is generally determined by the required dielectric thickness for cable insulation at the particular voltage. The thickness of the thermoplastic material or holdout layer, is such that it will provide sufficient strength to counteract the contractive force of the expanded (stretched) elastomeric layer. This contractive force is transmitted across the interface to the thermoplastic layer where it generates compressive hoop stress which can cause creep of the thermoplastic layer and/or collapse of the article.

The relationship of parameters including both the minimum thickness of the expanded and non-expanded article can be expressed by the following equation.

$$h = \frac{a^3(K^2 + R^2 - 1)^3}{GEK^3} \times P^{\frac{1}{4}}$$

where
h = the thickness of the holdout layer i.e. thermoplastic material in expanded form
a = the internal diameter of the expanded elastomeric layer
K = the ratio of the inner diameter of the holdout layer to the inner diameter of the elastomeric layer in the non-expanded article.
G = numerical factor generated from Sturn's Equation (see T. Baumelster (Editor)—*Standard Handbook for Mechanical Engineers*, 7th Edition, McGraw-Hill (1958), pg. 5-64, and R. G. Sturn—*University of Illinios, Exp. Sta. Bull.*, No. 12, Nov. 11, 1941 both incorporated herein by reference.
E = modulus of elasticity $$P = GE \frac{\text{Thickness of non expanded holdout layer}^3}{\text{inner diameter of elastomeric layer}}$$

In general the article of this invention may be any diameter. A preferred inner diameter of the inner elastomeric layer is from about 10 to about 30 mm prior to expansion and about 30 to about 60 mm after expansion. A preferred article thickness of the outer layer is in the range from about 4 to about 6 mm when the article is used for 15 KV cable applications and about 6 mm to 10 mm for 20 KV cables applications. The inner layer will have a preferred thickness of between about 6 to 9 mm for use in the 10-15 kV range and 9 to 12 mm for 24 kV.

Further, the expansion i.e. the ratio of the diameter of the expanded article to the relaxed article is critical to prevent splitting, cohesive and adhesive failure and set time. Expasion should also be sufficient to allow the article to be fitted around the substrate to be covered. The expansion ratio therefore should be in the range of from about 20% to 400%, a preferred expansion range is from about 150% to 250%.

The elastomeric and thermoplastic layers are directly bonded together. Peel strength of the bond should be at least about 6 pli to prevent delamination, and is preferably at least about 10 pli and most preferably at least about 20 pli. In some instances, crosslinking of the elastomeric layer, particularly if the thermoplastic layer is also crosslinked, will enhance the bond strength between the layers.

Polymeric materials suitable for use as the thermoplastic material include, for example, resins comprising, for example polyolefins and olefin copolymers for example polyethylene, polypropylene, ethylene/proplyene copolymer and polybutenes; substituted polyolefins, for example, ethylene-vinyl acetate copolymer, ethylene-ethyl acrylate copolymer or other ethylene copolymers; substituted polyolefins, particularly halogen-substituted polyolefins, for example polyvinyl chloride, polyvinylidene chloride, polyvinylidene fluoride. Teflon 100 (a polytetrafluoroethylene manufactured by Du Pont), Teflon FEP (a copolymer of tetrafluoroethylene and hexafluoro-propylene manufactured by Du Pont), Teflon PFA (a copolymer of tetrafluoroethylene and perfluoroalkoxy moieties manufactured by Du Pont), Tefzel (a terpolymer of ethylene tetrafluoroethylene and a fluorinated monomer manufactured by Du Pont), and Halar (a copolymer of ethylene and chlorotrifluoroethylene manufactured by Allied Chemicals); polyesters, particularly segmented copolyester polymers, for example Hytrel (a segmented polyether ester copolymer derived from terephthalic acid, polytetramethylene ether glycol and 1,4-butanediol manufactured by Du Pont); polyurethanes; and styrene block copolymers, for example Kraton manufactured by Shell which are styrene-butadiene-styrene, styrene-isoprene-styrene and styrene-butylene-styrene block copolymers. The outer thermoplastic layer is preferably a conductive polymer.

Examples of elastomeric materials include elastomers comprising, for example, copolymers of dienes with olefinically unsaturated monomers, for example ethylene/propylene/non-conjugated diene terpolymers, styrene/butadienepolymers, butyl rubbers and copolymers of dienes with unsaturated polar monomers, for example acrylonitrile, methyl methacrylate, ethyl acrylate, vinyl pyridine and methyl vinyl ketone; halogen-containing elastomers, for example chloroprene polymers and copolymers, for example neoprene, chlorinated polyethylene, chlorosulphonated polyethylene, and Viton (a copolymer of vinylidene fluoride and hexafluoropropylene manufactured by Du Pont); copolymers of olefins with olefinically unsaturated esters, for example elastomeric ethylene/vinyl acetate polymers, ethylene/acrylic acid ester copolymers for example ethylene/ethyl acrylate and methacrylate copolymers and particularly ethylene/acrylic rubbers, for example Vamac (a terpolymer of ethylene, methyl acrylate and a curesite monomer manufactured by Du Pont); acrylic rubbers, for example polyethyl acryate, polybutyl acrylate, butyl acrylate/ethyl acrylate copolymers, and butyl acrylate/glycidyl methacrylate copolymers; silicone elastomers, for example poly-diorganosiloxanes, copolymers, block copolymers, and terpolymers of monomethylsiloxanes, dimethylsiloxanes, methylvinylsiloxanes and methylphenylsiloxanes, fluorosilicones, for example those derived from 3,3,3-trifluoropropyl siloxane and carborane siloxanes; elastomeric polyurethanes; and polyethers, for example epichlorohydrin rubbers.

The thermoplastic and elastomeric materials can contain fillers or other additives, if desired. For example alumina hydrate, or alumina hydrate/transition metal oxide mixtures or silicon carbide, clays, treated or untreated, or carbon black can be incorporated into either or both materials.

When the composite article is to be used to encapsulate a high voltage splice, the thermoplastic outer layer is preferably of a conductive polymer composition. Such compositions comprise a polymeric matrix, having dispersed therein conductive particles, e.g. carbon black, metal powders and the like.

The term "recoverable article" is used herein to mean an article the dimensional configuration of which may be made substantially to change when heated.

The articles of this invention are prepared by coextruding an outer tubular layer of thermoplastic material and an inner layer of elastomeric material. Single or multiple screw extruders which can be set for coextrusion are suitable for preparing the articles of the invention. The elastomeric materials and the thermoplastic materials along with any additives are placed in the appropriate chambers of the extruder and coextruded using an appropriate die face to give the desired inner diameter and the desired thickness, as discussed above. During coextrusion, the temperature is generally from about 150° C. to about 500° C. and the internal pressure, measured as breaker plate pressure, is from about 2,000 to about 10,000 psi. These values will vary somewhat depending on the materials used and their properties.

The coextruded composite tubular article may be cut to any desired length, at any time during the manufacturing process. For example, they may be cut to 310 to 360 mm if intended for use in enclosing joints between 15 kV cables and from about 370 to 400 mm if intended for use in enclosing joints between 24 kV cables.

After extrusion the inner layer and optionally the outer layer is crosslinked. Crosslinking may be by radiation or chemical means. Preferably, crosslinking is accomplished by subjecting the article to irradiation. Radiation dosages are preferably in the range of from about 1.0 to 30.0 Mrad and a preferred range is from about 6.0 to 20.0 Mrads depending on the particular elastomer, thermoplastic and any crosslinking agent, if any, used. Radiation is preferrably conducted at room temperature. If it is desired that the outer layer not be crosslinked but radiation crosslinking is desired for the inner layer then the desired thermoplastic may contain antirads or be chosen from those thermoplastics known not to substantially crosslinked at the radiation dosages used. Antirads and their function are well-known, see e.g., Charlesley, Atomic Radiation and Polymers (1960).

The article is then heated to a temperature at which both the thermoplastic and elastomeric layers have softened and then radially expanded to the desired degree. Any heating method can be used and the heating step can be integral with the crosslinking step if desired. Generally, the article will be heated as part of the expansion process. The article can be expanded by use of a mandrel, forced air or the like. The article is then cooled while retaining it in the expanded condition. After cooling the article retains its expanded configuration.

In the use of the coextruded articles of the invention, the article is positioned over the elongate substrate, e.g. a cable splice, to be enclosed by the article. As mentioned above, the article is stored at ambient temperatures which may reach as high as about 50° C. At such temperatures the thermoplastic outer layer is capable of retaining the elastomeric layer in the expanded configuration. After the article is positioned over the substrate, it is heated. The thermoplastic layer softens and weakens thereby allowing the elastomeric layer to shrink. Shrinkage, or recovery, of the elastomeric layer causes shrinkage of the thermoplastic layer as well due to the direct bond between the layer. In other words, on heating the entire composite article shrinks. The thermoplastic material may also possess elastic memory and enhance recovery of the composite article towards its original unexpanded dimensions.

Articles constructed in accordance with the invention are especially suitable for use in insulating and protecting high voltage cable joints, and certain materials are especially suitable for use in the construction according to the invention.

Optionally, an innermost layer may be added which has stress grading electrical impedance characteristics, which may be linear or, preferably, nonlinear in nature. These may be resistive, capacitive, or a combination thereof and the resistive component may be linear or nonlinear. By the term "linear electrical resistive material" there is meant a material which upon the application of a voltage obeys Ohm's Law. By the term "nonlinear electrically resistive material" there is meant a material, the electrical resistance of which varies with the voltage applied, that is, the current I flowing through the material when a voltage V is applied across the material substantially obeys the relationship: I=KV.

Layers having stress grading electrical characteristics may comprise a base of, for example, a polymeric material, mastic, paint or varnish, admixed with a compound having stress grading electrical properties provided that the layer does not interfere in any substantial way with recovery of the article.

The layer may be applied to the inner surface of the outer sleeve by any known method, for example, moulding, coextrusion, painting or spreading. The layer may be applied in the form of a solution, the layer adhering to the inner surface of the outer sleeve upon evaporation of the solvent. Where the layer is, for example, a polymeric material, it may be extruded as a tube and placed inside and advantageously adhered to the inner layer of elastomeric material such that on heat-shrinking of the article, the layer will be forced into intimate contact with the article.

The article of the invention can be used to enclose any elongate substrate and is particularly useful for enclosing high voltage electrical equipment such as joints between power cables and terminations of cables. By high voltage electrical equipment is meant equipment designed to operate at above 1 kilovolt (kV) typically at 15, 25 or 35 kV.

DESCRIPTION OF THE DRAWINGS

FIG. 1 is a traverse sectional view showing the article of the invention as a tube where the holdout layer of a thermoplastic portion is on the outside and the elastomeric portion on the inside.

FIG. 2 shows a traverse sectional view showing the article of the invention prior to expansion.

FIG. 3 shows the article of the invention and the relationship between pressure and compressive loop stress.

Referring to the drawings, the heat shrinkable tube 4 shown in FIG. 1 is enclosed by the holdout layer 3 and coextruded with elastomeric layer 5. The article has an inner diameter of the elastomeric layer 1 and an inner diameter of the holdout layer 2.

In FIG. 2 the drawing is similar to FIG. 1 except in a nonexpanded condition 8. The holdout layer 6 is coextruded with elastomeric layer 9. The article has an inner diameter of the elastomeric layer 7 and an inner diameter of the holdout layer 10.

In FIG. 3 the article of the invention 11 shows the direction of the pressure generated by the stretched elastomer layer 12 which is transferred to the holdout layer 10 which generates compressive loop stress 13 in the holdout layer which can cause creep and collapse.

The following examples illustrate suitable combinations of elastomeric and thermoplastic materials for use in the invention and the production of tubular composite articles therewith.

EXAMPLE 1

| Thermoplastic Formulations | | | | |
|---|---|---|---|---|
| | Weight Percent (wt. %) | | | |
| | A | B | C | D |
| Elvax 770 | 83.50 | — | — | — |
| Alathon 3445 | — | 83.50 | — | — |
| DPD 6169 | — | — | 39.80 | 14.70 |
| Alathon 7030 | — | — | 39.70 | 67.80 |
| Agerite MA | 1.00 | 1.00 | .80 | .80 |
| Ketjen black EC200 | 15.50 | 15.50 | 19.70 | 16.70 |

Elvax 770
Ethylene vinyl acetate copolymer (9.5% vinyl acetate) DuPont
Alathon 3445
Ethylene vinyl acetate copolymer (3.5% vinyl acetate) DuPont
DPD 6169
Ethylene ethyl acrylate copolymer (18% ethyl acrylate) Union Carbide
Alathon 7030
High Density Polyethylene (Density 0.95) DuPont
Agerite MA
Polymerized 1,2-dihydro-2,2,4-trimethylquinoline Vanderbilt
Ketjen black EC200
Conductive carbon black, Akzo chemie

EXAMPLE 2

| Elastomeric Formulation | | | |
|---|---|---|---|
| | Parts by Weight | | |
| | E | F | G |
| Nordel 1320 | 100 | — | — |
| Epcar 545 | — | 100 | — |
| Vistalon 6505 | — | — | 100 |
| Diphenylamine Acetone | 2 | 2 | 2 |
| Zinc 2-mercaptobenzothia zole | 3 | 3 | 3 |
| Ferric Oxide | 2 | 2 | 2 |
| ERD-90 | 3 | 3 | 3 |
| Translink 37 | 40 | 50 | 80 |
| Vinyl Silane | 1.2 | 1.5 | 2.4 |
| Vistanex LM-MH | 10 | 20 | 30 |
| Drakeol 35 | 3 | 7 | 10 |
| Trimethyol propane trimethacrylate | 4 | 4 | 4 |

Nordel 1320
Ethylene propylene diene terpolymer (DuPont)
Epcar 545
Ethylene propylene diene terpolymer (Goodrich)
Vistalon 6505
Ethylene propylene diene terpolymer (Exxon)
ERD-90
90% Red lead in 10% ethylene propylene rubber (Wyrough and Loser)
Translink 37
Surface treated aluminum silicate (Freeport)
Vinyl Silane
Silane coupling agent (Union Carbide)
Vistanex LM-MH
Polyisobutylene (Exxon)
Drakeol 35
White mineral oil (Penreco)

EXAMPLE 3

Using the formulations of Example 1 and 2 tubular composite articles were made by extrusion using an extruder with a modified Genca coextrusion head at a speed of about 24 rpm and a breaker plate pressure (i.e. pressure against the die) of about 4500 to about 5000 psi at a final temperature of about 360° C. The average outer diameter of the articles be 1.945 cm. The articles are then irradiated at or about 20 Mrad, crosslinking both the inner and outer layer. The articles were then radially expanded at 150° C. by air pressure to a ratio of about 100% to 250% then cooled to room temperature. The articles are then cut to the desired length of between about 310 mm to 430 mm.

What is claimed is:

1. A heat-recoverable tubular composite article comprising:
   (a) an inner layer comprising a crosslinked elastomeric polymeric material having a modulus at 100% elongation at 20° C. of about 40 to about 900 pounds per square inch; and
   (b) an outer layer comprising a thermoplastic material having a 2% secant modulus at 20° C. of about 5,000 to about 100,000 pounds per square inch;

said composite article (1) being formed by coextrusion, (2) having a direct bond maintaining said layers permanently bonded together, said bond having a peel strength of at least 6 pounds per linear inch, and (3) being in a radially expanded configuration, said thermoplastic outer layer being capable of retaining the elastomeric inner layer in an expanded configuration at ambient temperature and incapable of retaining the elastomeric layer in an expanded configuration at an elevated temperature thereby permitting both layers of said composite article to recover, when heated, to or toward its unexpanded configuration.

2. An article according to claim 1 wherein the elastomeric-polymeric material is from about 10 to about 30 milimeters diameter prior to expansion and from about 30 to about 60 milimeters after expansion.

3. An article according to claim 1 wherein the thermoplastic layer is from about 4 to about 6 milimeters thick before expansion.

4. An article according to claim 1 wherein the thermoplastic material has been crosslinked.

5. An article according to claim 1 wherein the modulus at 100% elongation at 20° C. for the inner layer is from about 70 pounds per square inch to about 200 pounds per square inch.

6. An article according to claim 1 wherein the article is radially expanded from about 20% to 400%.

7. An article according to claim 1 wherein the 2% secant modulus of the inner layer is from about 15,000 to 60,000 pounds per square inch.

8. An article according to claim 1 wherein the outer layer is an ethelene/vinyl acetyle polymer.

9. An article according to claim 1 wherein the outer layer is ethelene/ethyl acrylate polymer.

10. An article according to claim 1 wherein the outer layer is polyethylene.

11. An article according to claim 1 wherein the inner layer is an ethelene/propylene copolymer.

* * * * *

UNITED STATES PATENT AND TRADEMARK OFFICE

CERTIFICATE OF CORRECTION

PATENT NO. : 4,634,615

DATED : January 6, 1987

INVENTOR(S): WILLEM VERSTEEGH, LESTER TOY, CHRISTINE HOLLAND

It is certified that error appears in the above-identified patent and that said Letters Patent are hereby corrected as shown below.

In col. 4, at line 23, change "expanded" to non-expanded".

In col. 4, at line 24, change "expanded" to "non-expanded".

In col. 4 between lines 28 and 29, add "R = expansion ratio".

In col. 4, lines 36-39 replace the formula with $$P = GE \left( \frac{\text{thickness of non-expanded holdout layer}}{\text{inner diameter of elastomeric layer}} \right)^3$$

Signed and Sealed this

Thirteenth Day of December, 1988

Attest:

DONALD J. QUIGG

Attesting Officer

Commissioner of Patents and Trademarks